United States Patent
Birli et al.

(10) Patent No.: US 8,356,778 B2
(45) Date of Patent: Jan. 22, 2013

(54) MODULAR ROOFTOP PIPE SUPPORT

(75) Inventors: Mary E. Birli, Garfield Heights, OH (US); Scott E. Anderson, Garrettsville, OH (US); Edward J. Lynch, Akron, OH (US); Raymond S. Laughlin, Middlefield, OH (US); Eric C. Osborn, Medina, OH (US); Raymond M. Olle, Broadview Heights, OH (US)

(73) Assignee: ERICO International Corporation, Solon, OH (US)

( * ) Notice: Subject to any disclaimer, the term of this patent is extended or adjusted under 35 U.S.C. 154(b) by 280 days.

(21) Appl. No.: 12/641,575

(22) Filed: Dec. 18, 2009

(65) Prior Publication Data

US 2010/0155545 A1 Jun. 24, 2010

Related U.S. Application Data

(60) Provisional application No. 61/138,583, filed on Dec. 18, 2008, provisional application No. 61/152,401, filed on Feb. 13, 2009.

(51) Int. Cl.
   *F16L 3/00* (2006.01)

(52) U.S. Cl. ............. 248/73; 248/65; 248/70; 248/74.2; 248/74.3; 248/74.4

(58) Field of Classification Search ................ 248/49, 248/68.1, 65
See application file for complete search history.

(56) References Cited

U.S. PATENT DOCUMENTS

| | | | |
|---|---|---|---|
| 3,152,784 A * | 10/1964 | Robinson | 248/74.1 |
| 3,968,323 A | 7/1976 | Blanchet | |
| 4,502,653 A | 3/1985 | Curtis, Jr. | |
| 4,618,114 A | 10/1986 | McFarland | |
| 4,826,113 A | 5/1989 | Winters | |
| 4,835,933 A * | 6/1989 | Yung | 52/685 |
| 5,014,939 A * | 5/1991 | Kraus et al. | 248/70 |
| 5,040,753 A * | 8/1991 | Roth | 248/74.2 |
| 5,217,191 A | 6/1993 | Smith | |
| 6,092,960 A * | 7/2000 | McCallion | 404/70 |
| 6,105,216 A | 8/2000 | Opperthauser | |
| 6,206,613 B1 * | 3/2001 | Elkins | 405/157 |
| 6,679,460 B2 * | 1/2004 | Nicolia et al. | 248/74.1 |
| 6,682,025 B2 | 1/2004 | Turner et al. | |
| 6,866,445 B2 * | 3/2005 | Semler | 404/119 |

(Continued)

FOREIGN PATENT DOCUMENTS

DE 1849260 U 4/1962
(Continued)

OTHER PUBLICATIONS

International Search Report and Written Opinion from corresponding International Application No. PCT/US09/68658.

(Continued)

*Primary Examiner* — Amy J Sterling

(74) *Attorney, Agent, or Firm* — Renner, Otto, Boisselle & Sklar, LLP

(57) ABSTRACT

An extruded or molded elastomeric (e.g., rubber) or polymeric multi-piece (e.g., two-piece) modular pipe support system utilizes a wide base with protrusions and/or recesses, and a separate top with recesses and/or protrusions that engage the protrusions and/or recesses of the top. The tops are configured to securely capture a pipe/conduit without any additional parts, straps, etc. The top may have one or more pipe-receiving recesses for receiving the pipes (conduits).

19 Claims, 14 Drawing Sheets

U.S. PATENT DOCUMENTS

| | | | | |
|---|---|---|---|---|
| 7,621,486 | B1 * | 11/2009 | Barrepski | 248/65 |
| 2006/0131465 | A1 | 6/2006 | Lynch, Jr. et al. | |
| 2007/0120036 | A1 | 5/2007 | Olle et al. | |
| 2008/0148535 | A1 | 6/2008 | Santin et al. | |

FOREIGN PATENT DOCUMENTS

| | | |
|---|---|---|
| DE | 19805401 A1 | 8/1999 |
| FR | 1123839 A | 9/1956 |
| GB | 1328792 A | 9/1973 |
| JP | 10-274358 A | 10/1998 |
| JP | 2003156179 A1 | 5/2003 |
| JP | 2003-240162 A | 8/2003 |
| KR | 20-0156739 Y1 | 9/1998 |

OTHER PUBLICATIONS

"OLYFLOW PipeGuard", OMG Roofing Products, Agawam, Massachusetts, (2008), www.olyfast.com.

Supplementary European Search Report from corresponding European Application No. 09837967.0.

* cited by examiner

MODULAR ROOFTOP PIPE SUPPORT

This application claims priority under 35 USC 119 to U.S. Provisional Application No. 61/138,583, filed Dec. 18, 2008, and to U.S. Provisional Application No. 61/152,401, filed Feb. 13, 2009. Both of the above applications are incorporated herein by reference in their entireties.

BACKGROUND OF THE INVENTION

1. Field of the Invention

This invention relates to the rooftop pipe supports.

2. Description of the Related Art

There is a general need to provide support for rooftop piping systems such as electrical conduits, natural gas piping and condensate drain lines. The supports must elevate the piping or equipment high enough to clear common rooftop obstacles (like expansion joints and seams). The elevation also serves to keep the piping from lying directly in standing water or to provide the necessary slope for drain or condensate lines. In addition, the supports often need to be free-floating to avoid penetrating the roof membrane, as well as to accommodate movement in the piping system due to expansion or contraction in the piping due to extreme temperature fluctuations. Currently, the most common method of providing support uses short lengths of pressure-treated lumber (typically a nominal 4"×4") as a support, with the pipe held in place using commonly available 1 or 2-hole pipe straps.

There are a number of issues with this method of support: the wood will eventually rot to the extent that it is no longer providing the necessary support, the hardware will rust, splinters or sharp edges on the wood can penetrate the roof membrane, etc. In addition, the wood is heavy and difficult to move, and additional tools (saw and screwdriver or socket wrenches) are required for installation. More recently, quasi-engineered rooftop pipe supports have been introduced into the market. These products, while overcoming many of the issues associated with the lumber method, may have their own shortcomings, as most require the use of strut hardware to secure the pipe, and most do not offer the ability to accommodate elevation changes. Further, some of these products are very light, leaving them prone to movement by wind and errant workers.

SUMMARY OF THE INVENTION

An extruded or molded elastomeric (e.g., rubber) or polymeric multi-piece (e.g., two-piece) modular pipe support system utilizes a wide base with one or more toothed slots/channels, and a separate top with a matching number of toothed posts that engage the toothed channels in the aforementioned base. The slots allow an installer to easily facilitate elevation changes without the need for tools. The tops may be configured to securely capture a pipe/conduit without any additional parts, straps, etc.

The present product addresses, and overcomes, issues of prior supports. In effect it provides all of the same benefits of the "lumber pipe support" method without any of the drawbacks. The product is easy to carry, but also self-ballasting by virtue of the weight associated with the material (e.g., extruded rubber) used in the base. No tools are required for installation. Most importantly the modular design easily facilitates elevation changes by simply sliding or snapping the top out of the base and sliding it back in at a different height.

A rooftop pipe support has one or more of the following features: modular design consisting of a variety of tops that can support single or multiple runs of pipe, or even be used to create a strut "bridge" connecting two or more bases; interlocking teeth on pedestals of the top mesh with teeth on channels in the bottom to facilitate elevation changes; uniform spacing of interlocking teeth allows for precise height adjustment in regular increments; the orientation of (e.g., downward angle of) the interlocking teeth cause them to flatten upon application of the load, wedging the teeth into the mating opening on the bottom, effectively locking the top half of the support to the bottom without the need for glue or additional fasteners; distal arms extending up from the top that almost completely encircle the pipe/conduit; option to use an interlocking latch mechanism in the distal arms that when closed provides a secure method of retaining the pipe/conduit without the use of separate straps or fittings; a catch that is past the vertical but above the horizontal, in the upper quadrants of the pipe section—this location ensures that the pipe is retained even if the latch should accidentally open; accommodates multiple sizes of pipe inside the top by using collapsible sections that are attached to the distal arms so that a secure fit is achieved on the smaller pipe size, and where the collapsible section pushes out of the way to accommodate successively larger pipe sizes; use of a plastic, steel or wire latch or clip that snaps over the return lips on each of the distal arms to effect a positive closure to prevent the pipe from being lifted out of the pipe support; use of the channel in one version of the base to accept a pipe and facilitate even lower elevations, such as might be desired when running condensate lines, which are sloped to facilitate proper drainage and are often run at heights as low as 5.1 cm (2 inches); use of a small insert plug with distal arms that encircle the pipe/conduit and is inserted into the base channel to provide support for a pipe running inside the channel itself; use of interchangeable tops to facilitate support of more than one run of pipe/conduit; use of bridge or platform tops that span multiple bases and support multiple runs of pipe/conduit or even sections of formed metal strut; an option to install a bridge containing the toothed pedestals across multiple bases and attach a variety of different styles of pipe straps to the bridge to secure the pipe/conduit; and use of a formed stamped steel or molded rubber strap with anchor holes for roof penetrations, wherein the strap is passed through the channel opening in the bottom of the support to effect a positive attachment to the roof deck through the pre-punched holes in regions where such attachment is required by Code or specification to meet wind load requirements.

According to other aspects of the invention, an extruded rubber modular pipe support system that utilizes a variety of tops, many with V-shaped troughs, to support multiple sizes and/or runs of pipe/conduit that are secured in the V-trough with an adjustable strap. The aforementioned tops are connected to a series of bases via dovetail-style connections, the bases being available in a variety of heights to facilitate elevation changes on the piping system, with integral fold under blocks or additional spacer blocks available that can be attached to the bases via additional dovetail joints in the bases to facilitate incremental elevation changes.

At least some supports described herein address and overcome drawbacks of some prior supports. Further, present supports described herein provide all of the same benefits of the lumber support method without any of the drawbacks. The product is easy to carry, but self-ballasting by virtue of manufacturing it (for example) by extruding rubber. No tools are required for installation, and the modular configuration facilitates elevation changes by simply sliding out one base and sliding in another of different height or folding out or sliding in additional spacer blocks to achieve the desired height.

According to an aspect of the invention, a modular pipe support includes a variety of tops that can support single or multiple runs of pipe, or even be used to create a strut "bridge" that connects two or more bases.

According to another aspect of the invention, there are V-shaped troughs in two versions of the modular tops. The V-shaped trough serves to position single or multiple runs of pipe in the V and allows a small number of tops to support a large range of pipe diameters.

According to yet another aspect of the invention, dovetail slots in the extruded profiles are used to connect the tops to the bottoms, as well as to accept the steel strap attachments and the spacer "legs" that allow for additional height adjustment. The rubber can be extruded with male dovetails in one component and the female dovetail in the second component. The dovetails allow an end-user to field assemble the rooftop pipe support to the desired height, without requiring the use of tools According to still another aspect of the invention, female dovetails are in both the top and bottom components, and a steel or plastic "bowtie" connector serves as a spline to field-join the two components together at the dovetails.

According to a further aspect of the invention, a spacer block allows for one height adjustment when in a vertical position, and a second height adjustment when rotated 90 degrees and installed horizontally.

According to a still further aspect of the invention, a colored, perforated/slotted rubber, plastic, or other material strap is used as a means to secure the pipe to the block in lieu of strut clamps or 1 or 2-hole pipe straps. The advantage of the strap is that it will accommodate a wide range of pipe sizes and requires no tools to install. By manufacturing the strap in a bright, high visibility color the strap also serves as a warning to maintenance personnel about a potential trip hazard on the roof. It will be appreciated that any of a variety of bright strap colors may be utilized.

According to another aspect of the invention, there are spaced slots in the attachment strap. The slots are spaced to allow for an appropriate fit for the pipe size being supported. The fit will hold the pipe in the pipe support without restricting axial movement, but by stretching the strap tighter an installer can secure a tight fit that does restrict axial movement.

According to yet another aspect of the invention, a dual V-block modular top has a collapsing center that can accommodate a larger range of pipe sizes. The center collapses to create a single large V-block from the two small V-blocks.

According to still another aspect of the invention, fold-under legs that originate either from the sides or center of the bottom block. The legs can be folded out/under via an attached hinge to facilitate a height adjustment. Expanding on this concept, a second hinge on the fold out/under block would allow the block to be folded again, effectively doubling the height increase.

According to an aspect of the invention, a rooftop pipe support includes: a base; and a top portion (insert) having a pipe-receiving recess. One of the top portion or the base has protrusions that engage recesses in the other of the top portion or the base, holding the base and the top portion together.

According to another aspect of the invention, a method of supporting a pipe above a roof, the method including the steps of: providing a base in contact with the roof; selecting a top portion that is engagable with the base, wherein the top portion is one of a set of top portions, engageable with the base, that have pipe-receiving surfaces; and mechanically coupling the top portion to the base by engaging a protrusion in one of the top portion or the base with the other of the top portion or the base.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily according to scale, show various aspects of the invention.

DETAILED DESCRIPTION

An extruded or molded elastomeric (e.g., rubber) or polymeric multi-piece (e.g., two-piece) modular pipe support system utilizes a wide base with protrusions and/or recesses, and a separate top with recesses and/or protrusions that engage the protrusions and/or recesses of the top. The tops are configured to securely capture a pipe/conduit without any additional parts, straps, etc. The top may have one or more pipe-receiving recesses for receiving the pipes (conduits).

Figure 1:
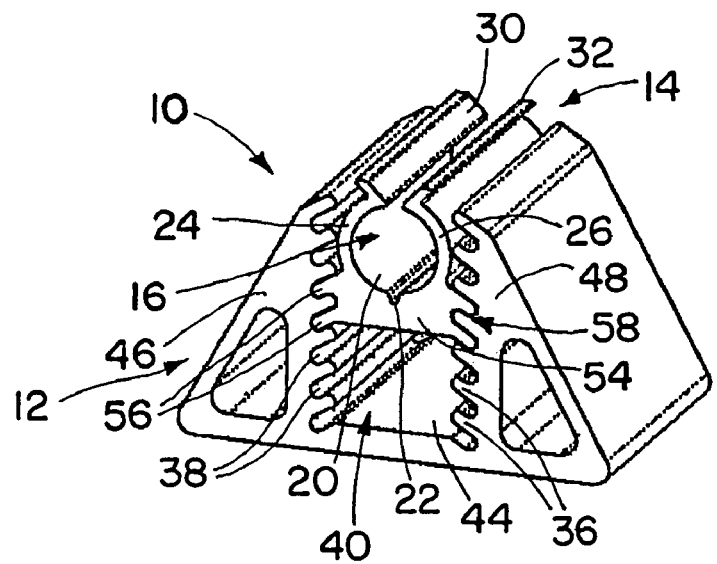
FIG. 1 is an oblique view of a rooftop pipe support in accordance with an embodiment of the invention.

FIG. 1 shows a small base support with a plug insert for elevations below 10 cm (4 inches). The support 10 includes a base 12 and an insert (top portion) 14. The terms "insert" and "top portion" may be used interchangeably in this description for parts that engage bases of various supports. The insert 14 has a pipe-receiving recess 16 for receiving one or more pipes or other objects. The term pipe, as used in this description, should be construed broadly to include other objects that could be support along runs, such as conduits. The pipe-receiving recess 16 is bounded by a rounded bottom surface 20 of the insert 14, upon which a pipe or other object can rest. The bottom surface 20 has a groove 22 therein. The insert 14 may include a pair of arms 24 and 26 that extend around sides and at least part of the top of the recess 16. The arms 24 and 26 may have respective radial protrusions or lips 30 and 32 at distal (free) ends of the arms 24 and 26. The protrusions 30 and 32 may be clipped together to close the top of the recess 16. A clip for holding together the ends of the arms 24 and 26 may take any of a variety of suitable forms and materials. Examples of suitable materials include plastic, steel, or wire.

The base 12 may have a trapezoidal or triangular shape, being wider at the bottom than at the top. The base 12 has a series of angled base teeth 36, with angled base slots or channels 38 between adjacent of the teeth 36. The teeth 36 and the slots 38 are located on either side of a central channel 40, running vertically from the top of the base 12 to a bottom wall 44 of the base 12. The base 12 has triangular elements 46 and 48 on opposite sides of the channel 40. The elements 46 and 48 have cutouts (open areas) in their centers, where no material is present. This reduces the amount of material needed, and reduces the weight of the base 12. The teeth 36 and the slots 38 are on surfaces of the elements 46 and 48 that face inward to the central channel 40.

The insert 14 has a body 54 below the recess 16. The body 54 has insert teeth 56 protruding out of opposite sides. Insert slots or channels 58 separate adjacent of the insert teeth 56 on each side of the insert body 54. The insert 14 and the base 12 are configured to engage one another, to hold the two parts together. Toward that end the insert teeth 56 are configured to fit into the base slots 38, and the base teeth 36 are configured to fit into the insert slots 58. The base teeth 36 and the insert teeth 56 may be configured to be mating parts, filling substantially all the space between the teeth 36 and 56. In other words, the base teeth 36 may fill substantially all of the insert slots 58, and insert teeth 56 may fill substantially all of the base slots 38 that the insert teeth 56 engage.

The teeth 36 and 56 and the slots 38 and 58 may be sloped, so as to better support the pipe or other object resting in the recess 16. To that end the insert teeth 56 may slope downward as they extend from the insert body 54. The base teeth 36 may extend upward from the side elements 46 and 48. It will be appreciated that the sloping teeth 36 and 56 better resist forces from above than horizontal teeth would. As the teeth 56 deform under the weight of a load, the teeth 56 are better wedged into the base slots 38. The teeth 36 and 56 may be sloped at an angle of about 30 degrees to the horizontal, although it will be appreciated that other slope angles may be utilized.

The various supports may be made from a variety of suitable materials, for instance including suitable rubber and/or plastic. More broadly, the materials may be extruded or molded elastomeric or polymeric materials.

The position of the insert 14 relative to the base 12 may be changed by changing which of the base teeth 36 are engaged by the insert teeth 56. The insert 14 may be disengaged from the base by sliding the insert 14 relative to base 12 in the direction of the width of the base 12 and the insert 14, the direction in which pipes or other objects would extend when laid in the recess 16. The modular design of the support 10 easily facilitates elevation changes by simply sliding the top out of the base 12 (or the insert 14) and sliding or snapping it back in at a different height.

Figure 2:
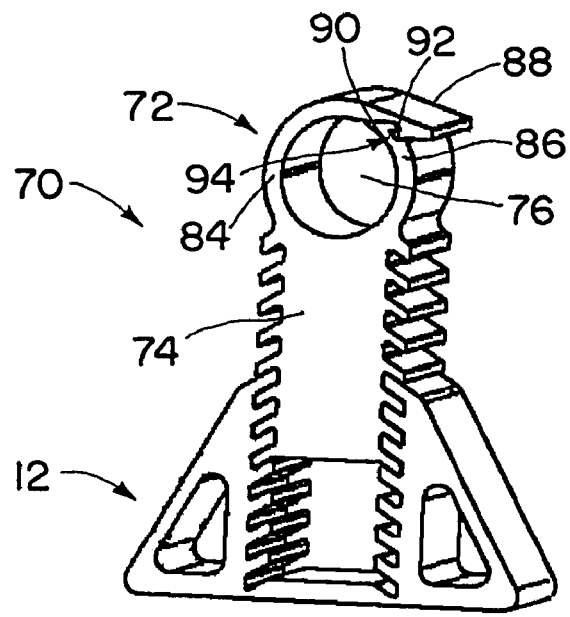
FIG. 2 is an oblique view of a rooftop pipe support in accordance with another embodiment of the invention.

FIG. 2 shows an alternative support 70 that utilizes the same base 12 as the support 10 shown in FIG. 1. However the support 70 uses a different insert 72, an insert with a post 74 that extends vertically much farther than the insert body 54 (FIG. 1) of the insert 14 (FIG. 1). This allows a pipe-receiving recess 76 defined by arms 84 and 86 of the insert 72 to be located at a greater height above the base 12. The inserts 14 and 72 may be configured so that the insert 14 is used to mount pipes or other objects at a lesser height above the roof, and the insert 72 is used to mount pipes or other objects at a greater height above the roof. The inserts 14 and 72 may constitute a set of inserts, both couplable to the base 12, that a user may select from for a specific situation.

The insert 72 has alternating teeth and slots that are similar to the teeth 56 and slots 58 (FIG. 1) of the insert 14 (FIG. 1). The insert 72 has more teeth than the insert 14, enabling the insert 72 to support a heavier load at a greater height above the roof (and above the base 12). The insert 72 may be a small base insert for smaller pipe sizes, and is shown elevated to 15 cm (6 inches) height.

The insert arms 84 and 86 have locking ends 88 and 90 that overlap and interlock to close off the recess 76. The end 88 may overlap the end 90, with the end 88 having an inward protrusion 92 (toward the recess 76) that engages a corresponding recess 94 in the end 90. The engagement of the protrusion 92 with the recess 94 occurs not at the top of the recess 76, but off to the side of the object-receiving recess 76. For example the overlapping and locking may occur over the upper quadrant of the recess 76 on the side of the insert arm 86. The insert arm 84 may be longer than the insert arm 86. The insert arm 84 may be stretched to overlap the arm 84 to get the protrusion 92 into the corresponding recess 94. The arm 84 can then be released, resiliently recoiling to some extent, locking the arms 84 and 86 together.

Figure 3:
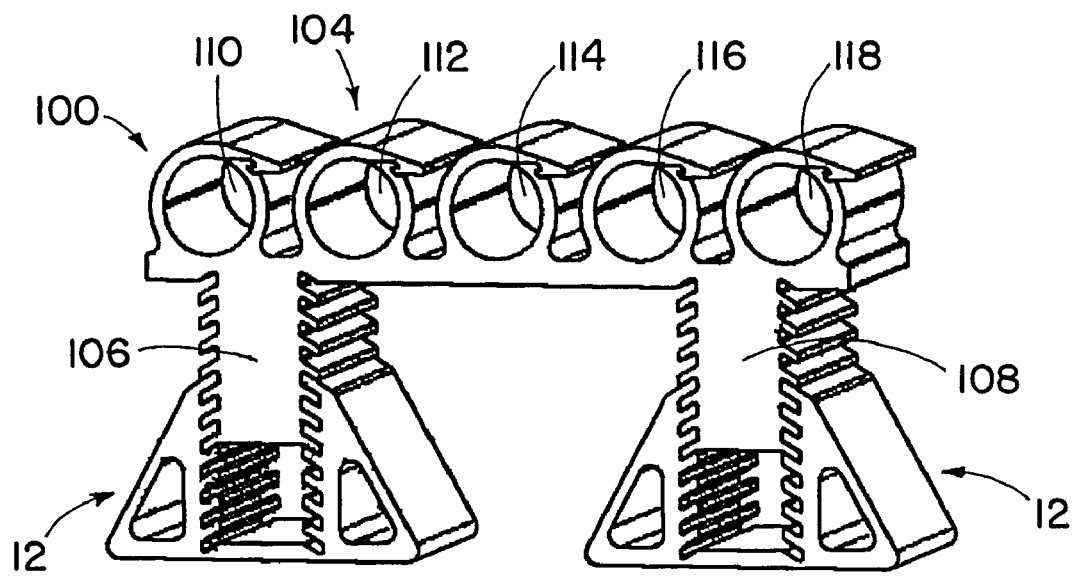
FIG. 3 is an oblique view of a rooftop pipe support in accordance with yet another embodiment of the invention, a support that is a bridge that attaches to two bases and supports multiple runs of pipe.

FIG. 3 shows a bridge support 100 that includes a pair of bases 12, and an insert 104. The insert 104 has a pair of toothed posts 106 and 108 that support a series of pipe-receiving recesses 110, 112, 114, 116, 118. The posts 106 and 108 may be similar to the post 74 (FIG. 2), and may engage the teeth of the bases 12 in a similar manner. The recesses 110-118 may be similar to the pipe- or object-receiving recesses described above, and may have closures similar to that of the arms 84 and 86 (FIG. 2).

Figure 4:
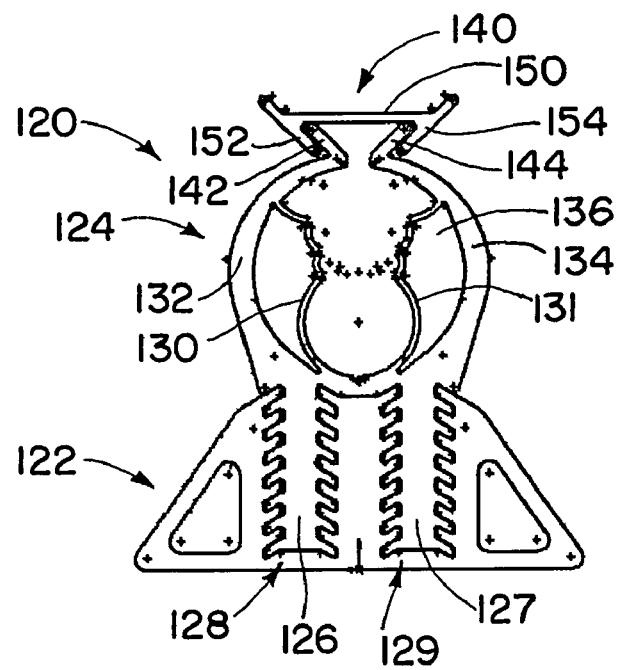
FIG. 4 is an oblique view showing a large base support with two posts, illustrating the concept of collapsible web section to fit multiple sizes of pipe, according to an embodiment of the invention.

FIG. 4 shows a support 120 that has an insert 124 that engages a base 122. The insert 124 has toothed posts 126 and 127 that engage respective toothed openings/channels 128 and 129 the base 122 in a manner similar to that of other embodiments described above. The insert 124 also has respective collapsible webs 130 and 131 within (or as a part of) arms 132 and 134 that define an object-receiving recess 136. The collapsible webs 130 and 131 are used to provide a more secure fit around the full range of pipe sizes in a particular top (insert). In the support described herein the collapsible arms (webs) 130 and 131 will make contact with the smallest size in the range for the top, then collapse outward towards the distal arms 132 and 134 when a larger pipe is installed, ultimately collapsing completely outward against the distal arms 132 and 134 when the largest diameter pipe is installed. This provides better securing of a range of sizes of pipes or objects.

The webs 130 and 131 may be appropriately-shaped thinner pieces of the material that the rest of the insert 124 is made out of. The webs 130 and 131 have shapes with curves to more easily accommodate different sizes/types of objects to be received. The webs 130 and 131 may have thinned portions that allow the webs 130 and 131 to preferentially bend at certain points.

The height of the insert 124 relative to the base 122 may be adjusted by engaging the posts 126 and 127 at different levels in the toothed channels 128 and 129 of the base 122. The insert 124 is engaged and disengaged from the base 122 in a manner similar to that of other supports described herein.

The support 120 includes a clip 140 for holding ends of the arms 132 and 134 together, so as to close off the top of the recess 136. The clip 140 engages and holds lips 142 and 144 at the ends of the arms 132 and 134. The clip 140 has a central body 150 and a pair of downturned ends 152 and 154 on opposite sides of the central body 150. The clip 140 may be made of any of a variety of suitable materials, for example being made of plastic, steel, or wire.

Figure 5:
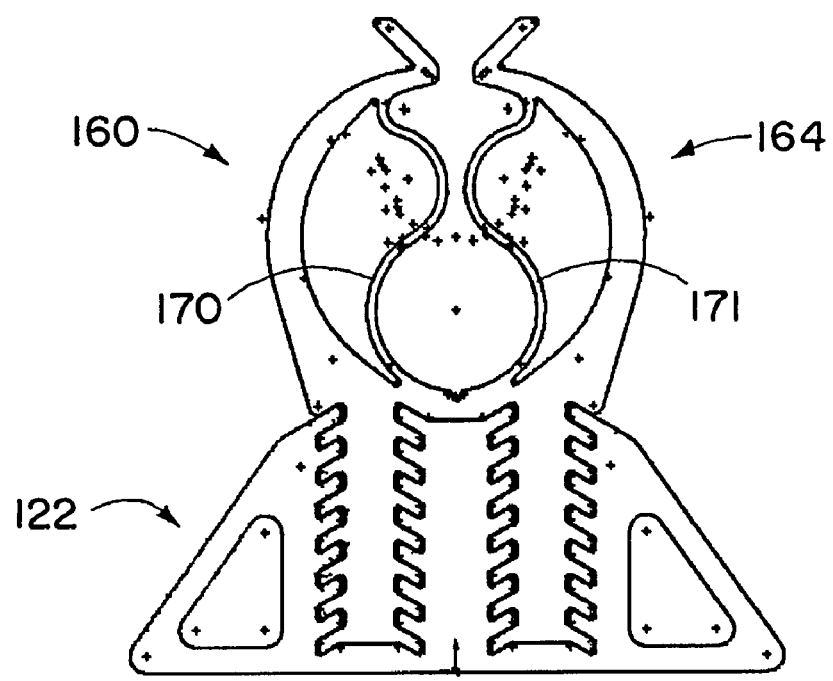
FIG. 5 is an oblique view showing a large base support with two posts, illustrating another embodiment of a concept of collapsible web section to fit multiple sizes of pipe.

FIG. 5 shows a support 160 that includes the base 122 engaged by an insert 164. The insert 164 differs from the insert 124 (FIG. 4) primary in the configuration of webs 170 and 171, which have a different shape from that of the webs 130 and 131 (FIG. 4).

Figure 6:
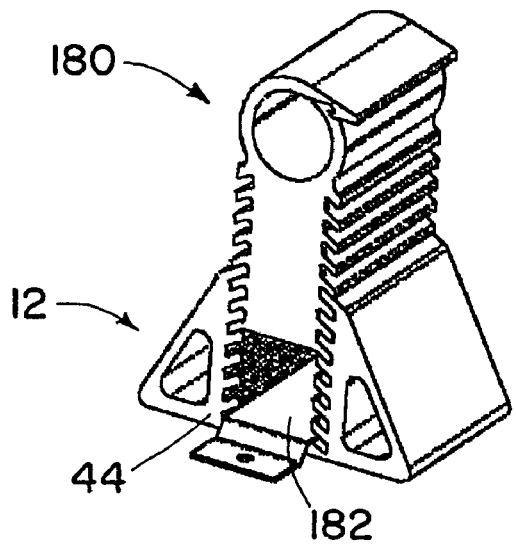
FIG. 6 is an oblique view showing a small base support, illustrating a concept for the retention strap that facilitates positive anchoring to a roof deck. The retention strap may be a stamped metal or molded rubber/plastic retention strap for fixing the support to roof decking.

FIG. 6 shows a support 180 that includes a retention strap 182 for fixing the base 12 to roof decking. The retention strap 182 may be made out of stamped metal, or molded rubber or plastic, to give a few examples. The retention strap may extend all the way across the base 12, extending from one side of the bottom wall 44 to the other. The strap 182 may have a hole or holes for receiving suitable fasteners, such as nails, bolts, or screws, to secure the strap 182 (and thus the support 180) to the roof decking.

Figure 7:
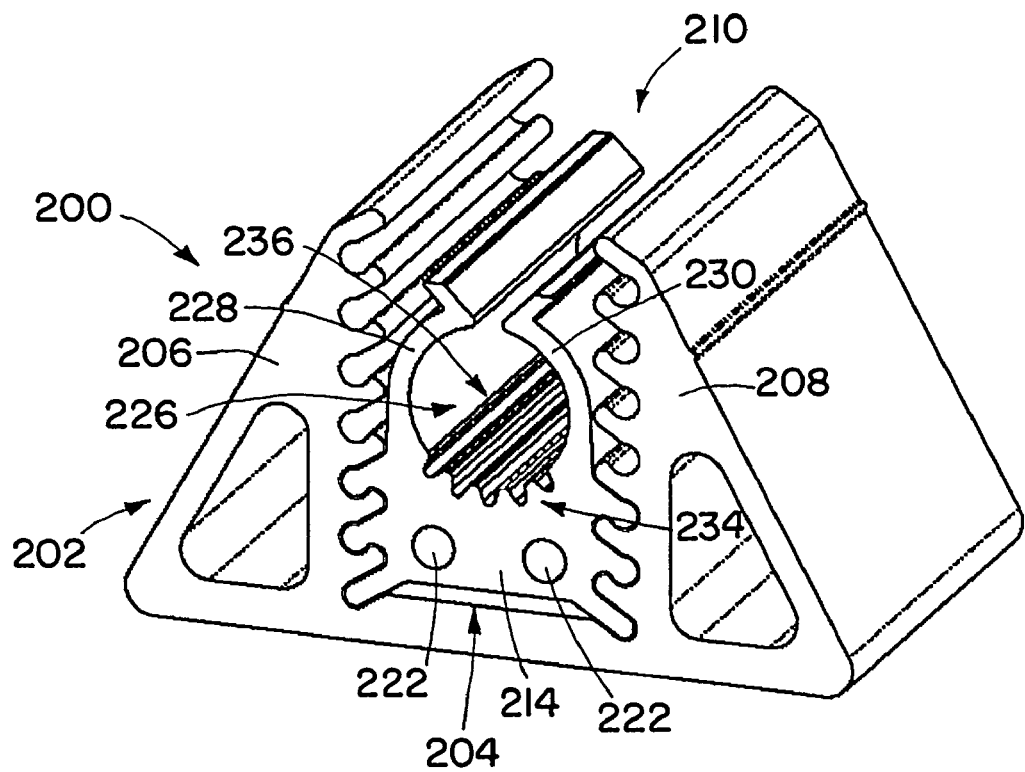
FIG. 7 is an oblique view of another embodiment support in accordance with the present invention.

Turning now to FIG. 7, a support 200 includes a base 202 and an insert 204. The base 202 is similar to the base 12 (FIG. 1), with side elements 206 and 208 that flex outward from the toothed central channel 210 as an insert body 214 of the insert 204 is inserted into the channel 210. The outward flexure is resilient, with the side elements 206 and 208 exerting an inward force on the insert body 214, after the insert 204 is inserted in the base central channel 210. The inward force helps maintain the teeth of the base 202 engaged with the teeth on the insert body 214.

The insert body 214 has holes 222 in it. The holes 222 run in a longitudinal direction, the same direction as objects would be oriented when placed in a recess 226 defined by arms 228 and 230 of the insert 204. The holes 222 reduce the amount of material and weight of the insert 204. The arms 228 and 230 have lips on their distal ends. The lips can be clipped together by a clip such as the clip 140 (FIG. 4).

The top of the insert body 214 has ridges 234 on it. The ridges 234 face the bottom of the recess 226. The ridges 234 separate grooves 236 between them. The ridges 234 run longitudinally, in the same direction as the pipes or other objects. The ridges 234 provide some flexibility to the top surface of the insert body 214. The ridges 234 allow some "give" to the top surface of the insert body 214, providing a softer surface for pipes or other objects to rest on.

Figure 8:
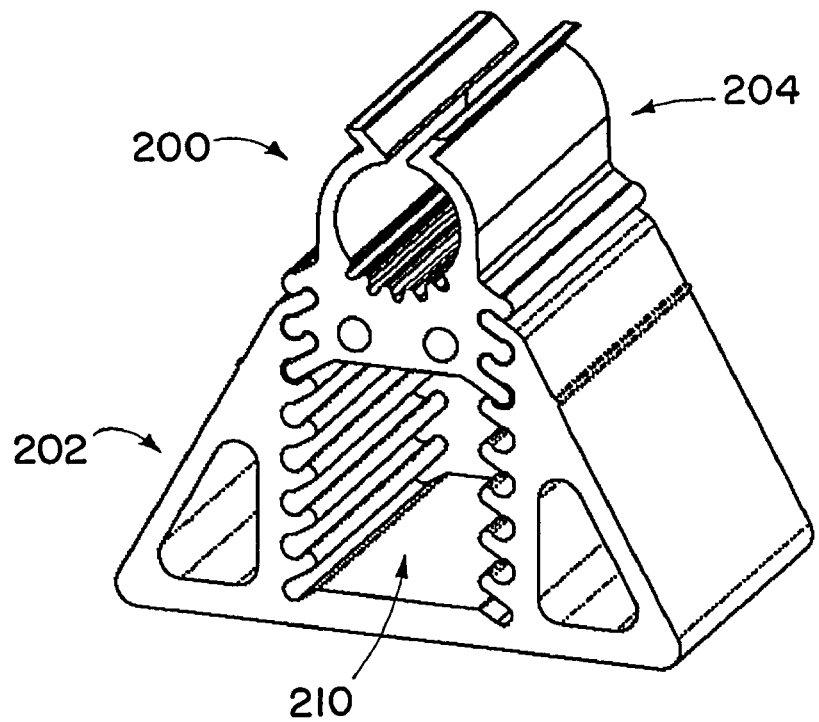
FIG. 8 is an oblique view of the support of FIG. 7, with the insert in an extended position away from the rooftop.

FIG. 8 shows the support 200 with the insert 204 at the higher level in the channel 210 of the base 202. The position shown in FIG. 8 is used to position pipes or other objects farther off a rooftop, compared to the configuration shown in FIG. 7.

Figure 9:
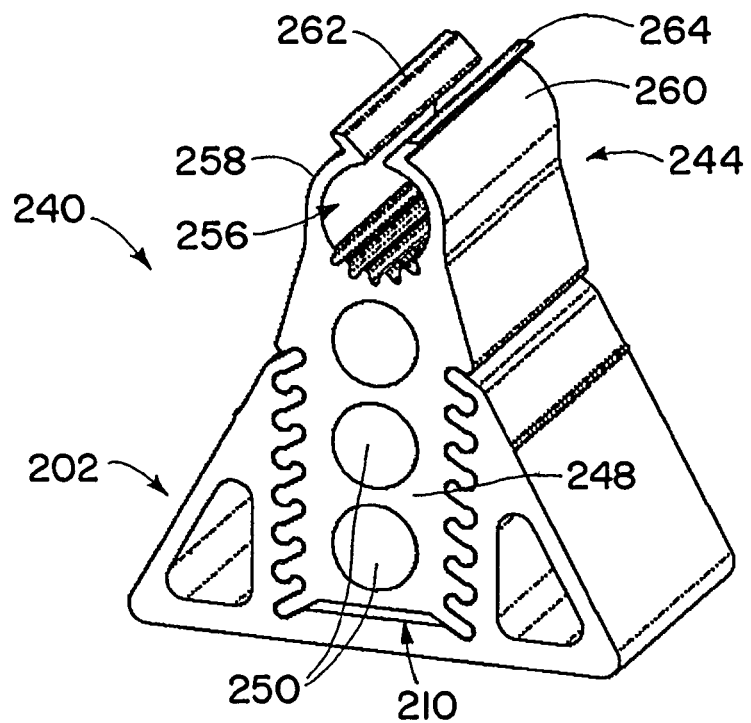
FIG. 9 is an oblique view of yet another embodiment support in accordance with the present invention.

FIG. 9 illustrates a support 240 which utilizes the same base 202 as the support 200 (FIG. 7). The support has an insert 244 with a toothed post 248 for engaging the teeth on the sides of the channel 210 of the base 202. The post 248 has a number of holes 250 along its centerline. The holes 250 reduce the amount of material needed and the weight of the insert 204. It is also possible to place additional objects into the holes, such as conduit or other pipe runs, to keep the additional objects above the rooftop.

The insert 244 has a pipe-receiving recess 256 that is wider than the post 248, and is wider than the channel 210. The recess 256 is bounded by a pair of arms 258 and 260. The arms 258 and 260 may have lips 262 and 264 at their distal ends for receiving a clip, such as the clip 140 (FIG. 4), to close the recess 256.

The insert 244 may be placed at various heights within the base channel 210. The engagement of the teeth of the post 248 with the teeth of the channel 210 is similar to that of other embodiments described herein.

Figure 10:
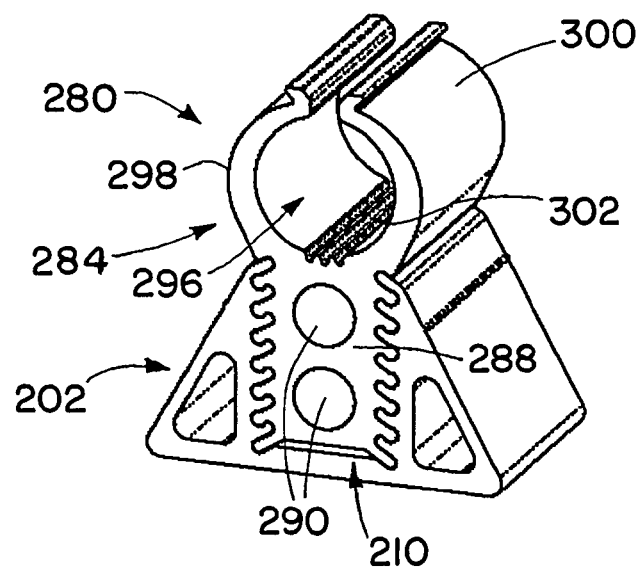
FIG. 10 is an oblique view of still another embodiment support in accordance with the present invention.

With reference now to FIG. 10, a support 280 includes the base 202 and an insert 284. The insert 284 includes a toothed post 288, having holes 290 therein. The post 288 engages the channel 210 of the base 202 in a manner similar to that of other embodiments, at any of various heights.

An insert pipe-receiving recess 296, defined by arms 298 and 300, is narrower than both the post 288 on which it rests, and the channel 210. Ridges/grooves 302 of the insert 284 are at the bottom of the recess 296, providing more flexibility and "give" for placing objects. The ridges/grooves 302 extend in a longitudinal direction, the axial direction of a pipe run that would be placed in the recess 296.

Various elements of the various embodiments described above may be combinable. For instance, it is possible to combine in a single support one or more of features such as: use of a collapsible webs; various mechanisms for closing a pipe-receiving recess; use of holes or other mechanisms to save material, reduce weight, and/or increase flexibility; use of single or multiple posts; use of an insert as a bridge between two or more bases, to support multiple pipes and/or objects in multiple insert recesses; use of ridges at a boundary to a pipe-receiving recess; and use of a retention strap.

The concept of using separate pieces, such as one or more bases that can be engaged by different types of inserts, offers more flexibility in the present system over other prior systems on the market. A user can easily interchange tops and bottoms to create a support tailored to the specific application. The user can select one of a set of top portions or bases to properly obtain the desired support and/or height of the pipe/conduit off of a rooftop. A user also has the ability to create platforms or bridge units by pairing tops with strut channel attached to two or more bases.

The concept of using interlocking teeth to join the top to the base helps to easily manage incremental elevation changes. Most (if not all) present products rely on primitive threaded rod posts to facilitate elevation changes. The threaded rods typically make for an unstable post due to the relatively thin column, and the result is often a wobbly platform that does not inspire confidence in the customer.

One present support is a height adjustable design that employs a single threaded rod with a shallow arc of steel welded to the top as a pipe support. This support may have stability problems, and may face failure during the pipe movement caused by the expansion and contraction cycles common to rooftop piping systems. The ability to easily make elevation changes is an important advantage, perhaps one of the singularly most desirable features not currently available on competing products.

The use of extruded or molded distal arms to substantially completely encircle the pipe to facilitate retention without requiring the use of secondary pipe straps or clamps. Other systems on the market (CADDY PYRAMID, Pipe Pier) utilize strut straps—which require tools to install—to secure the pipe to the support. Roofing contractors do not often have easy access to strut components, so this configuration offers easier installation than others on the market. Further, by extruding the distal arms we engage the pipe over the length of the base, aiding stability and retention. If a situation (or specification) requires a more secure retention system, a simple stamped steel, molded plastic or spring steel wire clip could be used to snap over the lips of the distal arms to provide a more secure lock.

The collapsible features in the top provide a more secure fit around the full range of pipe sizes in a particular top. Other products claim to accommodate a range of pipe sizes, but in one example when a 2.5 cm (1 inch) diameter pipe is placed in the top, the pipe-receiving area of the top is grossly oversized. This leads some contractors to add a sleeve of 10 cm (4 inch) pipe to preclude the 2.5 cm (1 inch) pipe from simply lifting out of the base. In the support described herein the collapsible arms will make contact with the smallest size in the range for the top, then collapse outward towards the distal arms when a larger pipe is installed, ultimately collapsing completely against the distal arms when the largest diameter pipe is installed.

Some prior supports are very difficult to positively attach (anchor) to a roof deck when roof penetrations are called for by building Code or specification. Installers will often use roof mastic to "glue" the roof support to the roof membrane, but in specific regions of the U.S. building Codes require a more positive form of attachment, typically involving roof penetrations. Such penetrations are difficult to effect on the aforementioned rooftop supports. Utilizing the channel(s) at the bottom of this product, a stamped steel, injection molded plastic or rubber strap (for example the strap 182 shown in FIG. 6) with pre-punched holes can be passed through the channel to either side of the support when the installer has easy access to pin the strap to the roof deck using the pre-punched holes in the strap.

In addition, the modularity of the top means we can offer tops with either a single pair or two pairs of distal arms that wrap around the pipe/conduit, as well as a platform with a perch (or recess) for strut channel, so that a "bridge" can be created using two or more bases.

Figure 11:
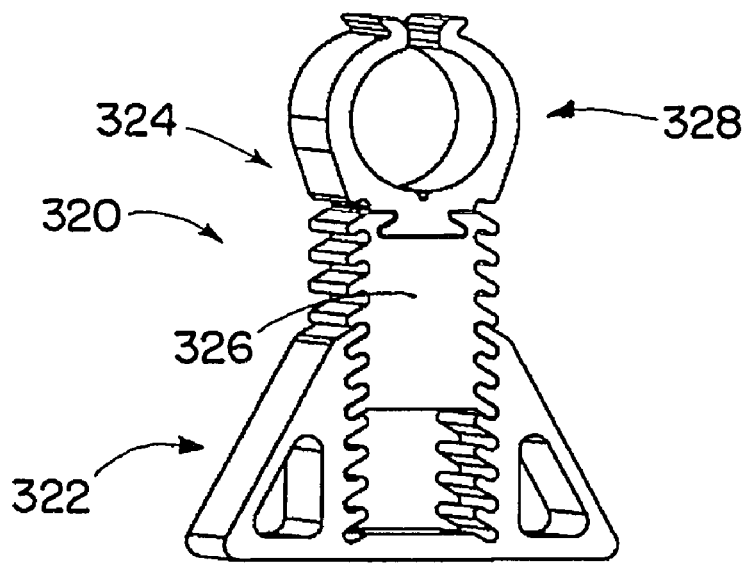
FIG. 11 is an oblique view of a three-part support in accordance with a further embodiment of the present invention.

It will be appreciated that the insert and/or the base described above in the various embodiments may be made up of multiple parts. An example is the support 320 shown in FIG. 11, which has a two-part insert (top portion) 324 that is inserted into and engages a base 322. The insert 324 includes a post portion 326 and a pipe-receiving portion 328. The portions 326 and 328 are held together by a dove-tail connection, with one of the portions (the pipe-receiving portion 328 in the illustrated embodiment) having a dove-tail protrusion that engages a correspondingly-shaped recess in the other of the portions. The use of such a configuration allows further modular configuring of the support. For instance the same type of post may be usable with multiple different types of pipe-receiving portions. It will be appreciated that supports that include four or more portions may be possible.

Figure 12:
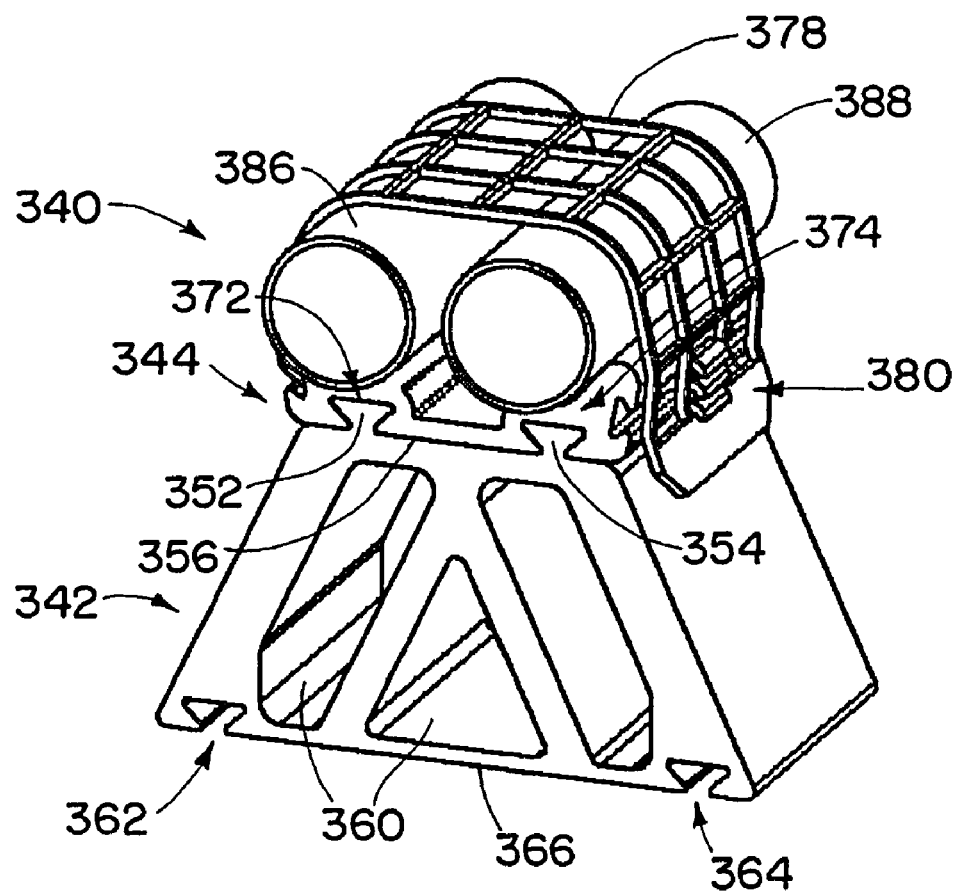
FIG. 12 is an oblique view of a support according to another embodiment of the present invention.
Figure 13:
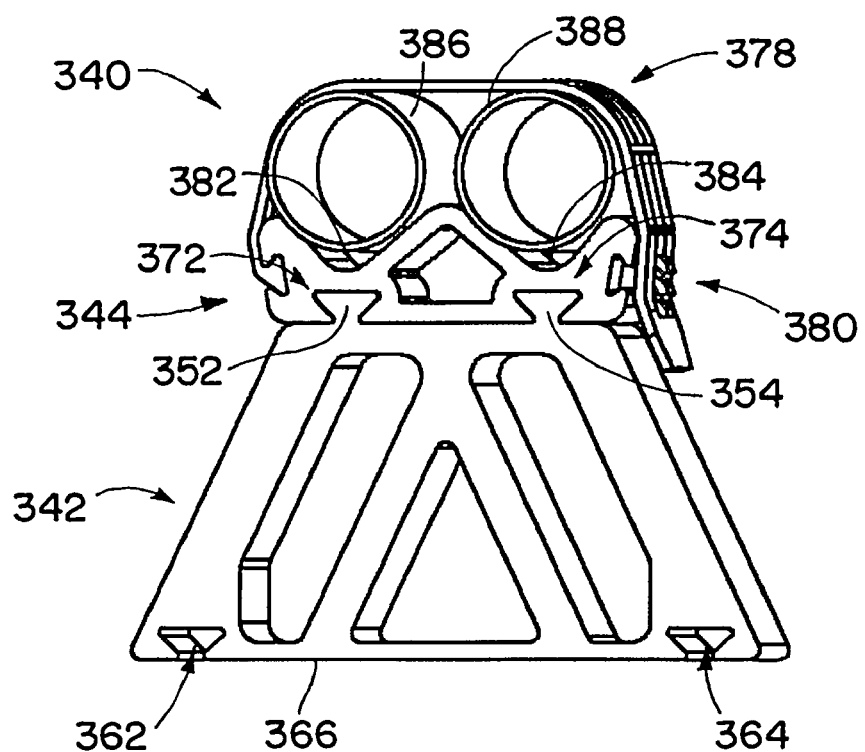
FIG. 13 is a side view of the support of FIG. 12.

FIGS. 12 and 13 show another embodiment, a support 340 having a base 342, and a top portion (insert) 344 connected to the base 342. The base 342 has a pair of dovetail protrusions 352 and 354 on its top surface 356. The dovetail protrusions 352 and 354 have relatively narrow necks, and relatively wide distal ends. The base 342 has a trapezoidal shape, with cutouts (empty spaces) 360 in the shape in order to save material and weight. The base 342 has a pair of dovetail-shape recesses 362 and 364 on a bottom surface 366. The recesses 362 and 364 may be used to receive dovetail protrusions, such as from legs (not shown) that could be used to increase the height of the base 342. The base 342 may be a 10 cm (4 inch) base, lifting the top portion 344 to a height of 10 cm (4 inches) above the rooftop.

The top portion 344 has a pair of dovetail-shape recesses 372 and 374 for receiving the base protrusions 352 and 354. The top portion 344 may slide onto the base 342, causing the protrusions 352 and 354 to engage the recesses 372 and 374. This holds the top portion 344 to the base 342.

The top portion 344 is a double V-groove top, with a mesh retention strap 378 attached to a latching mechanism 380. The top portion 344 has a pair of pipe-receiving grooves 382 and 384 for receiving pipes or other objects. The mesh strap 378 is a plastic mesh strap with substantially square holes. The strap 378 is attached at one side of the top portion 344. The strap 378 may be pulled over the top portion of the top portion, over the grooves 382 and 384, holding objects likes pipes 386 and 388 in place. The free end of the strap 378 engages the latching mechanism 380 to hold the strap 378 over the grooves 382 and 384 and the pipes 386 and 388. The latching mechanism 380 is attached to the opposite side of the top portion 344 from where the mesh strap 378 is attached. The latching mechanism 380 may be a metal part with a series of slots therein for receiving a part of mesh strap 378 therein. The slots may be angled downward such that the mesh strap 378 is retained in the slots after the stretching force on the mesh strap 378 is released.

It will be appreciated that a wide variety of variations on the support 340 are possible. The top portion 344 shown in FIGS. 12 and 13 may be one of a variety of top portions that may be coupled to the base 342. For example a top portion having a single groove may be coupled to the base 342 instead of the dual-groove top portion 344. As another alternative, the base 342 may be coupled to a top portion having features or characteristics of the other top portions or inserts described herein.

As a further alternative, one or more spacer blocks or legs may be installed at the bottom of the base 342, to increase the height of the support 340. For example one or more 2.5 cm×5 cm (1 inch×2 inch) spacer blocks or legs may be installed for 2.5 cm (1 inch) height adjustment (per block). The spacer blocks may have dovetail protrusions on a top surface that engage the recesses 362 and 364 in the base 342. The spacer blocks may also have similarly-shaped recesses on a bottom recesses for receiving the protrusions of another spacer block. The spacer blocks may thus be stacked to add to the height of the base 342.

Figure 14:
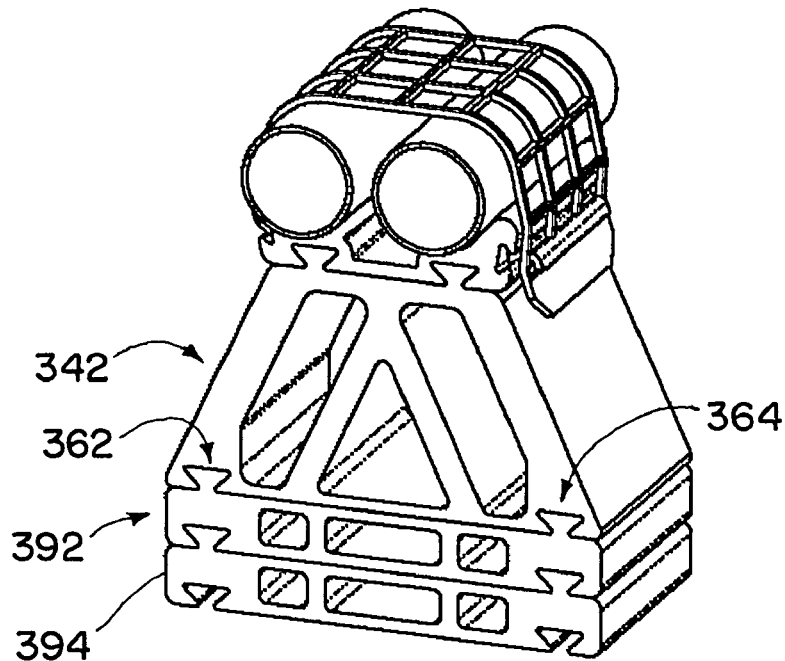
FIG. 14 is a side view showing the support of FIG. 12, with a pair of supports attached.
Figure 15:
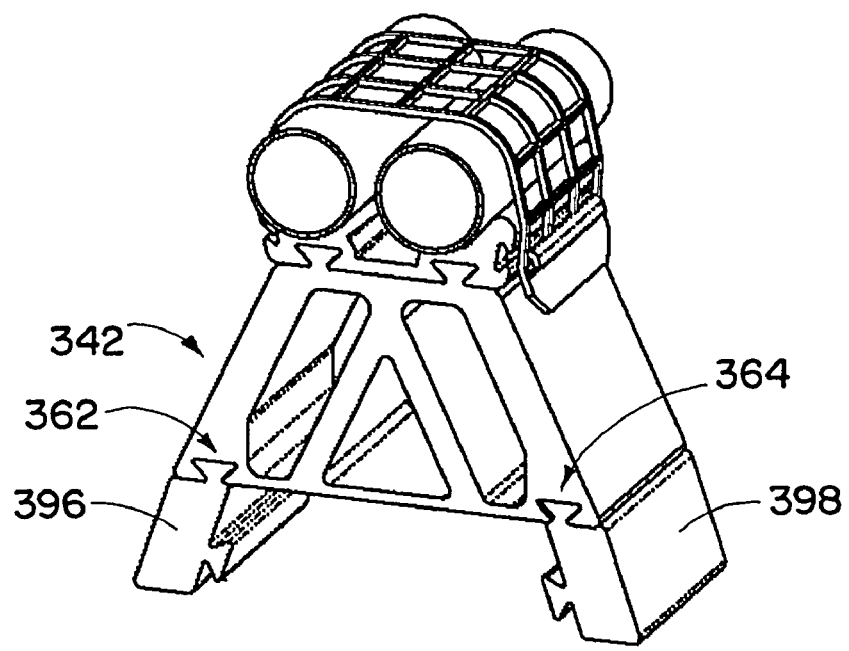
FIG. 15 is a side view showing the support of FIG. 12, with a pair of legs attached.

FIG. 14 shows a pair of spacer blocks 392 and 394 coupled to the bottom of the base 342. FIG. 15 shows another alternative, with legs 396 and 398 coupled to the bottom of the base 342, coupled to the recesses 362 and 364, respectively. The legs 396 and 398 have dovetail protrusions on their side surfaces, for coupling to the recesses 362 and 364 with on the legs 396 and 398 on their sides. This allows the legs to couple in an alternate way to the base 342, to provide a smaller height rise to the base 342.

Figure 16:
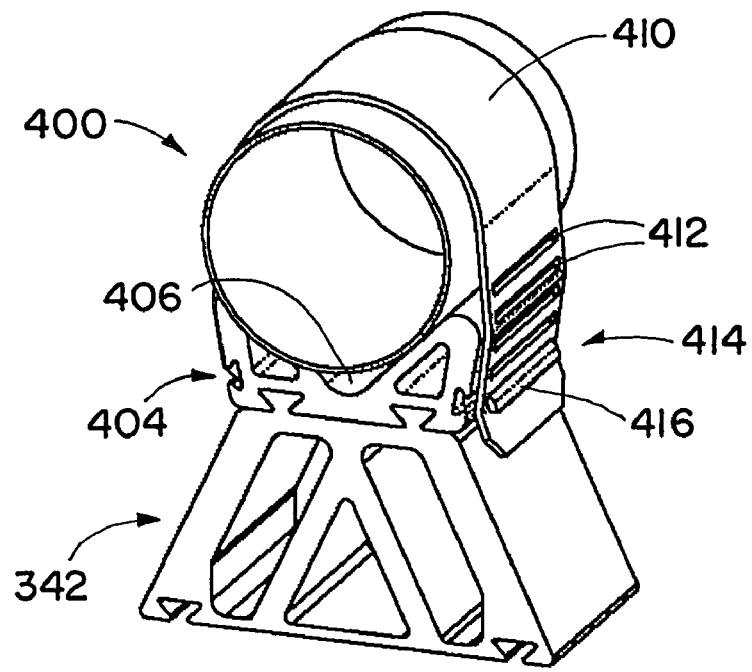
FIG. 16 is an oblique view of a support according to still another embodiment of the present invention.
Figure 17:
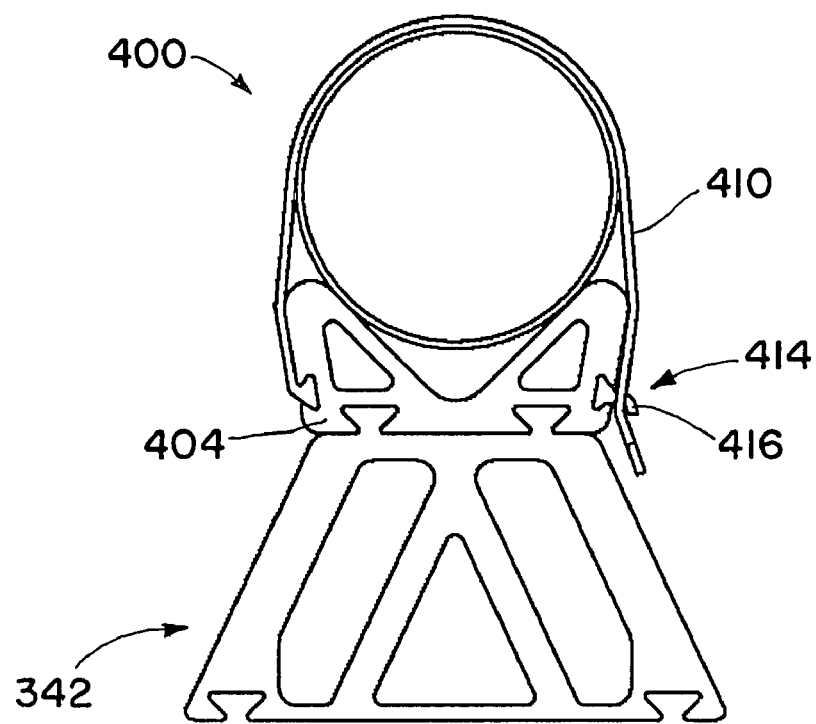
FIG. 17 is a side view of the support of FIG. 16.

FIGS. 16 and 17 show an alternative support 400 that includes a top portion 404 having a single groove (recess) 406. The top portion 404 engages the base 342 as described above. The top portion 404 also includes a solid strap 410 with slots 412 therein for engaging a latch mechanism 414, a protrusion 416 on the side of the top portion 404. The protrusion 416 is hooked downward to engage a slot 412 of the strap 410.

Figure 18:
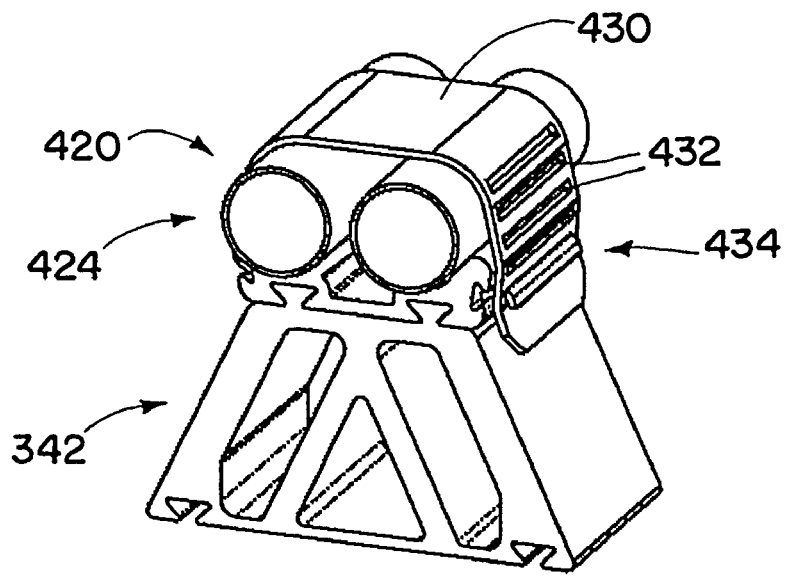
FIG. 18 is an oblique view of a support according to yet another embodiment of the present invention.
Figure 19:
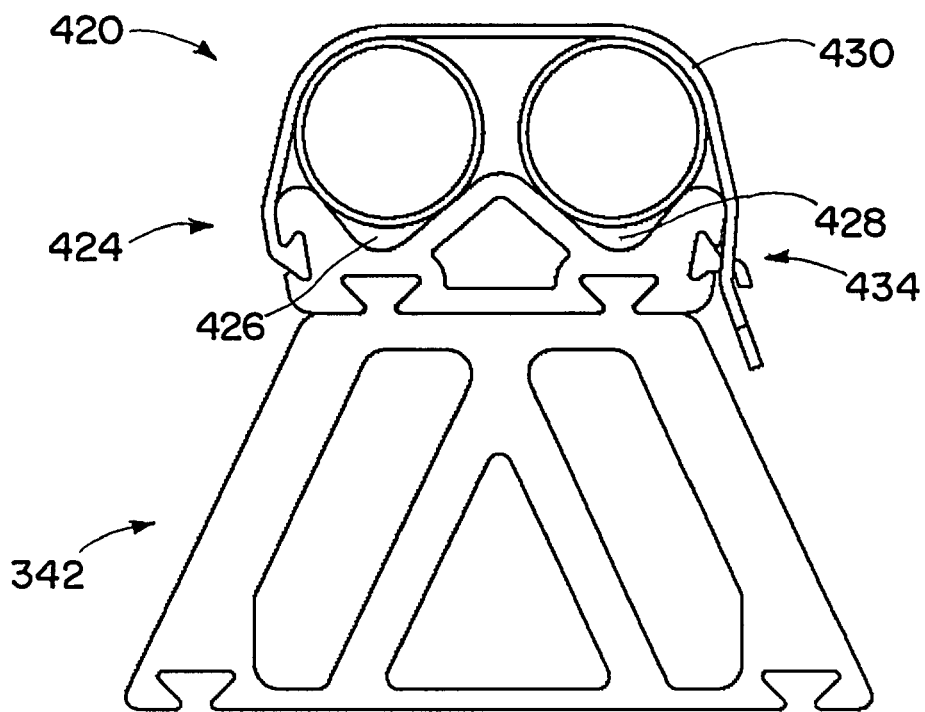
FIG. 19 is a side view of the support of FIG. 18.

FIGS. 18 and 19 show an alternative support 420 that includes a top portion 424 having double grooves (recesses) 426 and 428. The top portion 424 engages the base 342 as described above. The top portion 424 also includes a solid strap 430 with slots 432 therein for engaging a latch mechanism 434, a protrusion on the side of the top portion 424.

Figure 20:
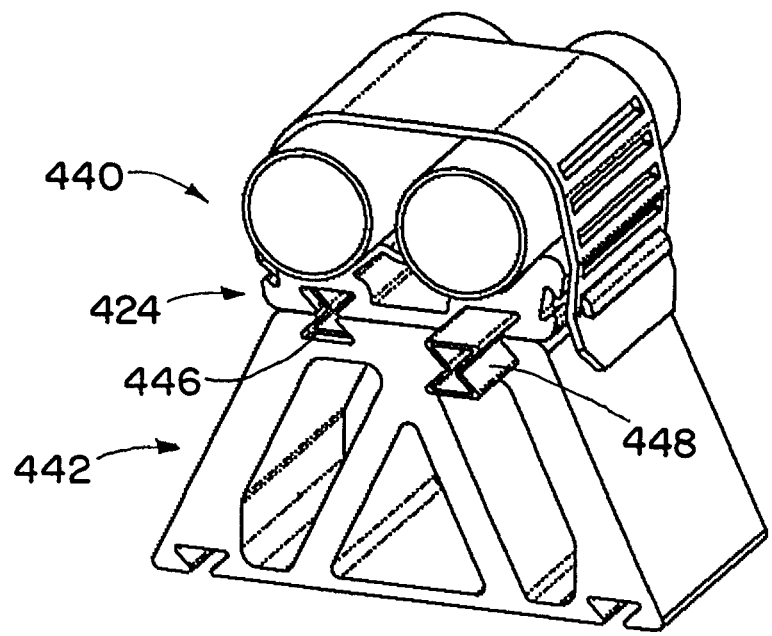
FIG. 20 is an oblique view of a support according to a still further aspect of the invention.
Figure 21:
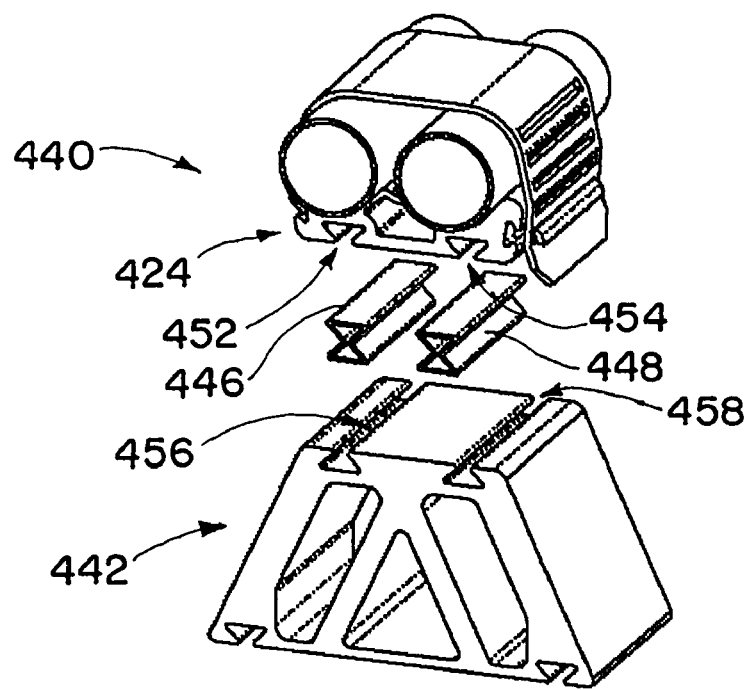
FIG. 21 is an exploded view of the support of FIG. 20.

FIGS. 20 and 21 show an alternative support 440 in which the top portion 424 is coupled to a base 442 by use of metal bow tie bent clips 446 and 448. The clips 446 and 448 engage top portion dovetail recesses 452 and 454 at the bottom of the top portion 424, and base dovetail recesses 456 and 458 at the top of the base 442.

FIGS. 22-27 show various ways in which a top portion 484 receives various pipe sizes. The top portion 484 may be coupled to any of the various bases described above. The top portion 484 has a central collapsible web 490 with a dimple 492 in it. The collapsible web 490 is between a pair of recesses 494 and 496. A strap 500 may be used to hold a pipe or pipes against the web 490 and/or in the recesses 494 and 496.

Figure 22:
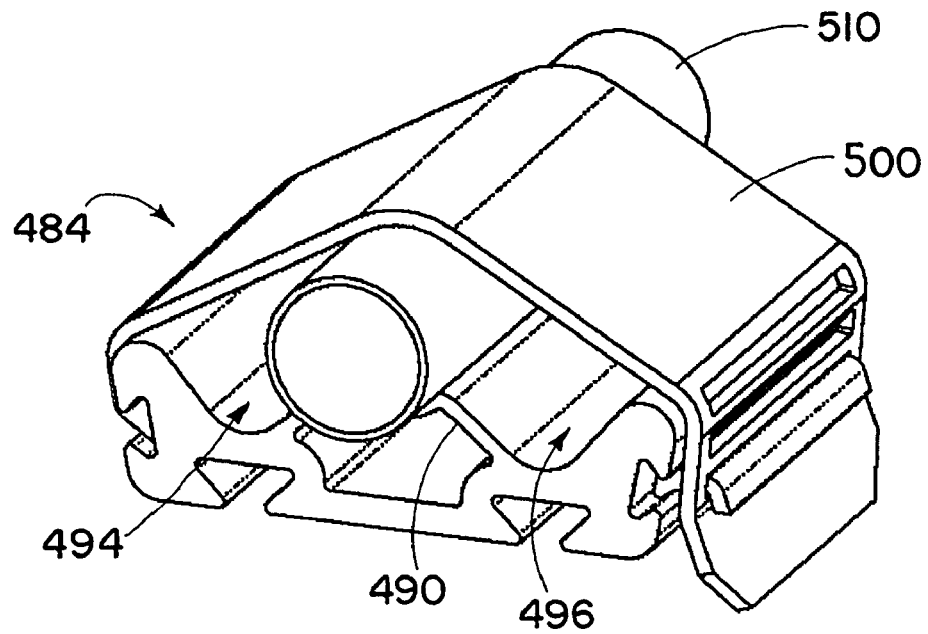
FIG. 22 is an oblique view of a support top portion according to another aspect of the invention.
Figure 23:
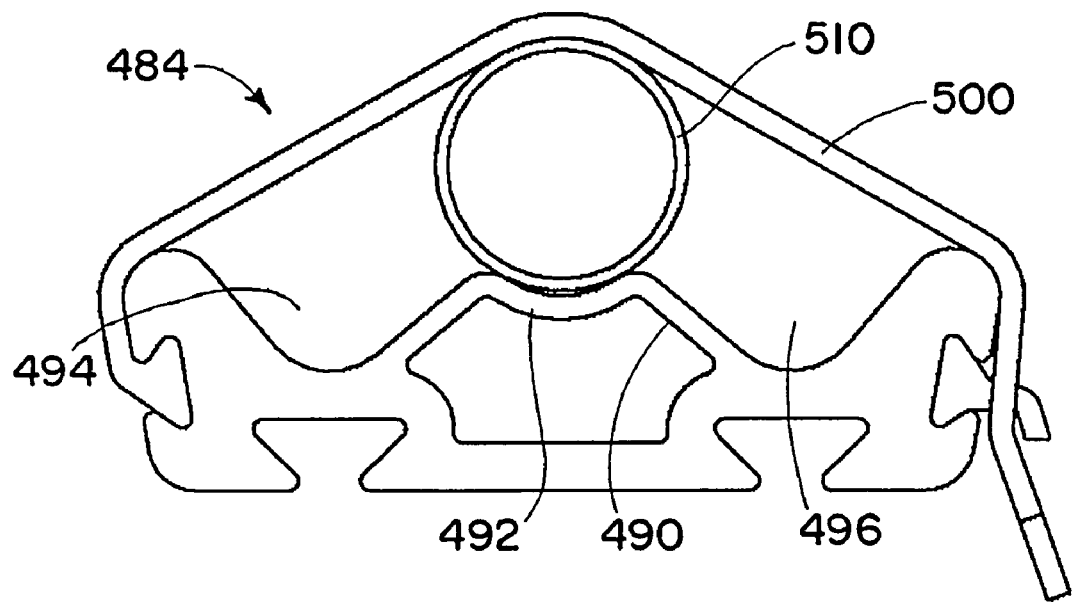
FIG. 23 is a side view of the top portion shown in FIG. 22.
Figure 24:
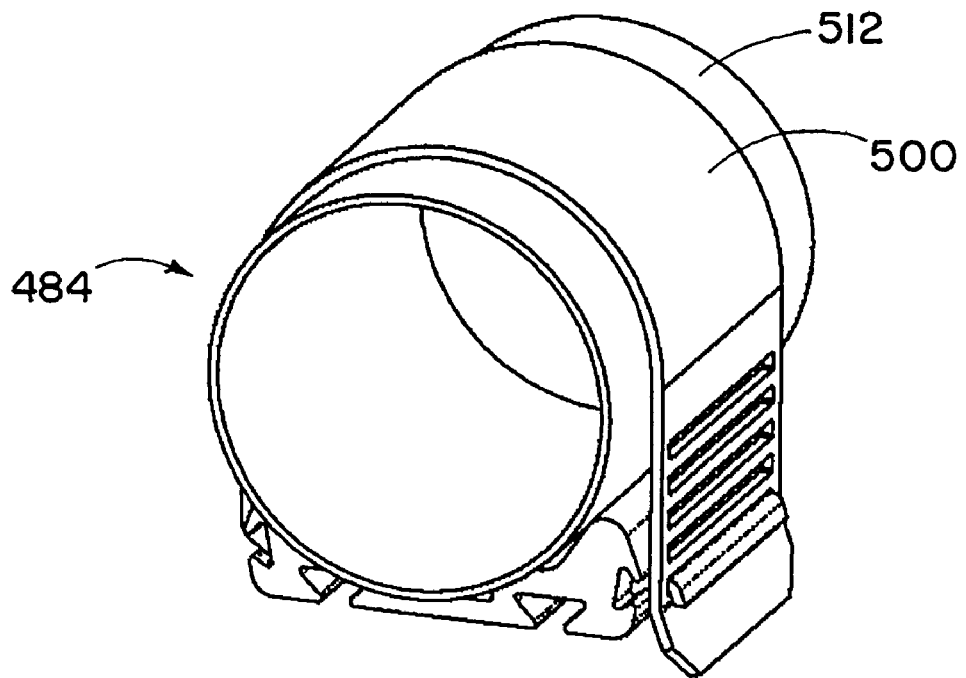
FIG. 24 is an oblique view of a support top portion according to yet another aspect of the invention.
Figure 25:
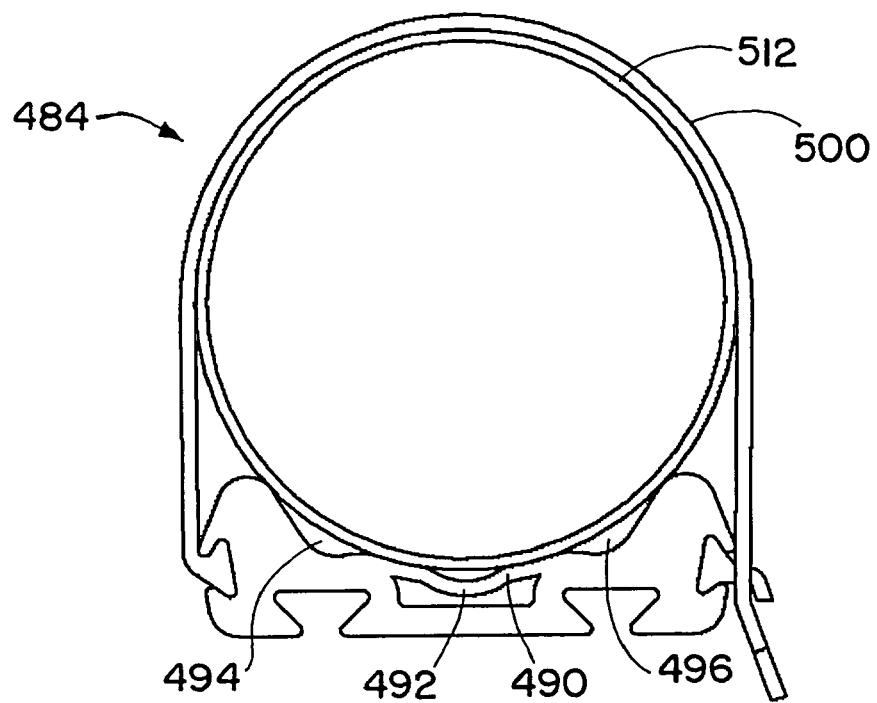
FIG. 25 is a side view of the top portion shown in FIG. 24.
Figure 26:
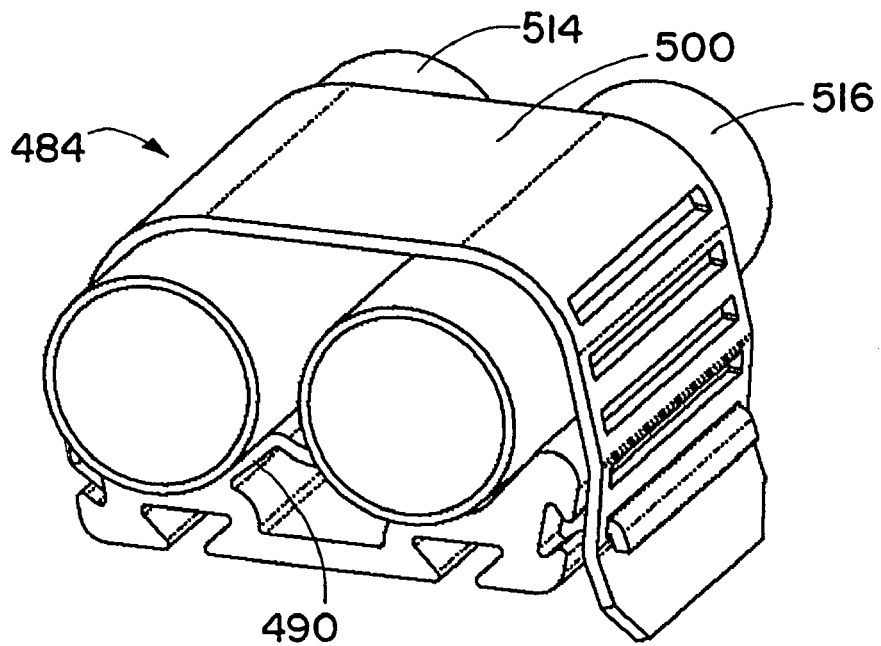
FIG. 26 is an oblique view of a support top portion according to still another aspect of the invention.
Figure 27:
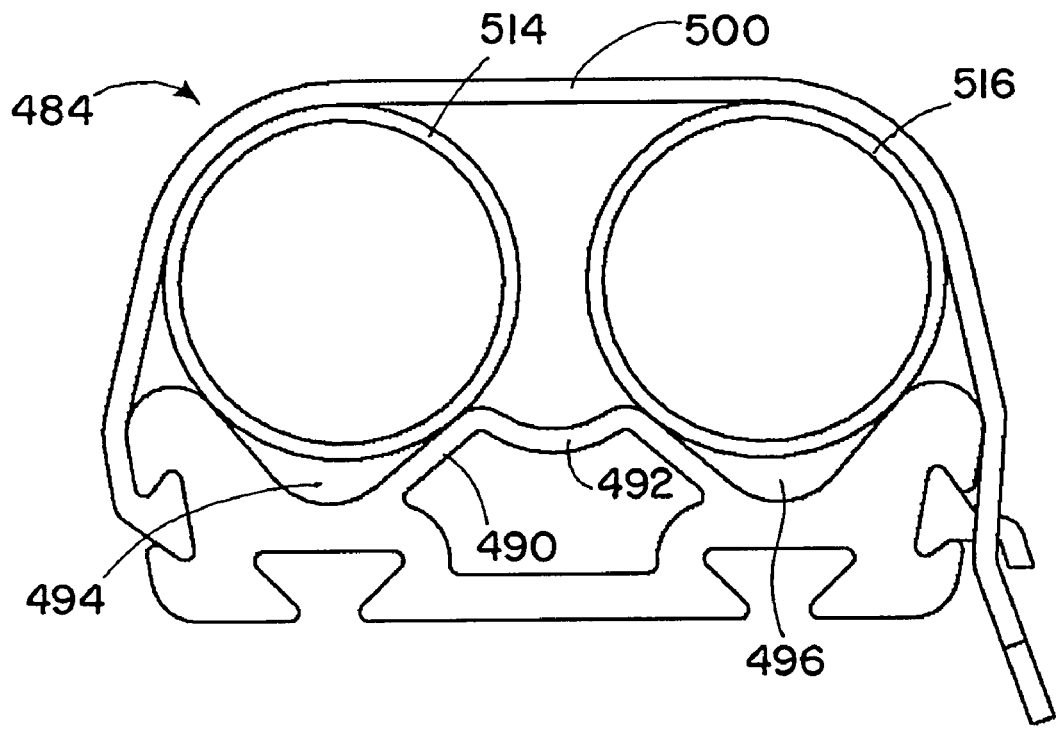
FIG. 27 is a side view of the top portion shown in FIG. 26.

As shown in FIGS. 22 and 23, a single small or light pipe 510 rests on the dimple 492, without compressing the collapsible web 490. Referring to FIGS. 24 and 25, a single heavy pipe 512 collapses the web 490. And in FIGS. 26 and 27, a pair of pipes 514 and 516 rest in the recesses 494 and 496, respectively.

Figure 28:
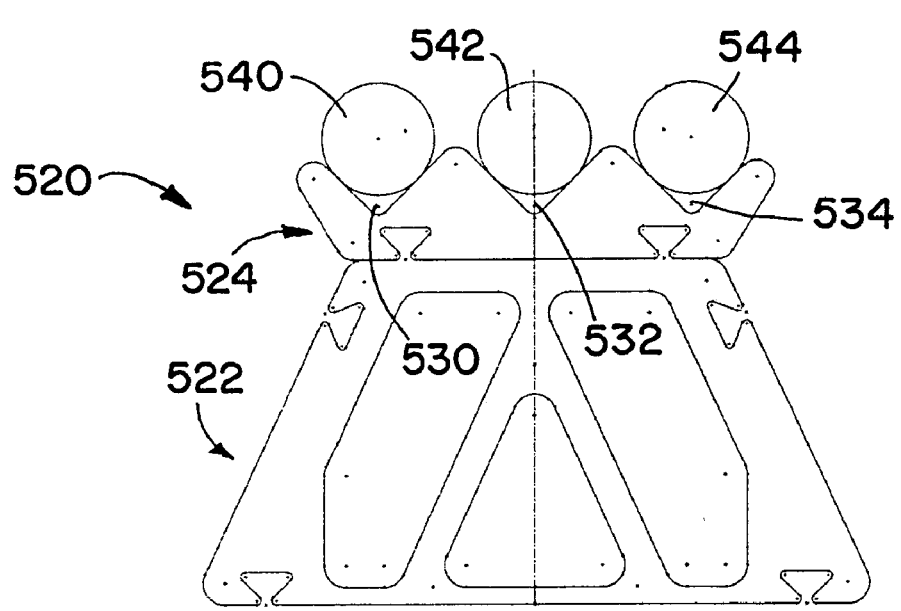
FIG. 28 is a side view of a support according to a further aspect of the invention.

FIG. 28 shows a support 520 that includes a base 522 and a top portion 524. The top portion 524 has three pipe-receiving recesses 530, 532, and 534, for receiving objects such as pipes 540, 542, and 544.

It will be appreciated that the various features of the various embodiments described above can be combined in a single support, where appropriate.

The concept of using separate pieces offers more flexibility compared with others on the market. A user can easily interchange tops and bottoms to create a support tailored to the specific application. A user also has the ability to create platforms by pairing tops with perches for strut channel with two or more bases.

The concept of using a V-groove to support the pipe requires fewer parts to cover a complete range of pipe sizes. A user can support 1.27 cm through 5.1 cm (0.5 inches to 2 inches) pipe on the small size, and can support 6.4 cm through 10.2 cm (2.5 inches through 4 inches) pipe on the large size V-groove. The only other known extruded rubber support on the market is a one-piece design that requires 4-5 different sizes to cover the full range of pipe sizes that we cover with two sizes.

In addition, the modularity of the top means we can offer tops with either a single or double V-groove, as well as a platform with a perch (or recess) for strut channel, so that a "bridge" can be created using two or more bases. The Rubber Triangle only supports a single pipe, so the present invention would offer an advantage over that design.

The dovetail joints are a proven method for joining two or more sections together, and since the tops, bottoms and adjustment legs are all made out of the same base material there should not be any risk of the connection loosening due to different rates of thermal expansion. Further, by using an interference fit in the dovetail joint, one can freeze the male dovetail of one component to contract it, and heat the female dovetail of the second up to expand the opening, and thus facilitate ease of assembly, but when the parts return to room temperature they will effectively be "locked" together. Further, a steel spline could be utilized in lieu of a male rubber dovetail joint. The spline would be inserted into adjoining female dovetails to facilitate the connection.

There are a variety of concepts for providing height adjustment on this system. Simple pads with a footprint matching the base of the main support could be extruded in a variety of thicknesses, with each pad containing one or more male dovetail joint(s) on top and one or more female dovetail joint(s) along the bottom to facilitate attachment of the pads to the main support. The end-user would simply add more pads until he reached the desired height. The pads could also be narrower pads, where two pads are required to effect a height increase, one installed on each side of the bottom of the primary support. Additional increases would be available by installing multiple pads into each other. As the height increases, the base would widen to maintain stability in the assembly.

Another option employs a 2.5 cm×5.1 cm (1 inch×2 inches) rotatable height adjustment block that provides two different heights by simply rotating the block 90 degrees prior to installation. This concept also utilizes the dovetail joint method of attachment.

A third concept developed has segmented extensions attached to the base via a thin membrane. The extensions could then be folded under the base and secured via pins or a keyed joint to facilitate one level of height increase. An additional pad of material attached to the first pad could then be folded under the first pad and attached in a manner similar to that described to offer a second height increase.

The retention strap could be made from extruded and expanded plastic mesh as shown in the pictures. Alternatively, it could be made from rubber with a series of slots that allow the strap to secure a variety of pipe sizes. It will be appreciated that other materials for the strap, such as metal, are also possible. The straps could be molded or extruded from yellow plastic/rubber to serve as notice of a trip hazard as well as advertising for CADDY. Other systems on the market (CADDY PYRAMID, Pipe Pier) utilize strut straps—which require tools to install—to secure the pipe to the support. Roofing contractors often do not have easy access to strut components, so the present support would offer easier installation than others on the market.

One concept uses a series of thin stackable legs that slide into each other via the dovetail joints still employed in the current concept. Other concepts moved away from multiple small legs in favor of the larger leg that allows for 2.5 cm (1 inch) or 5.1 cm (2 inches) height adjustment, depending on the installation orientation. In addition, other concepts have a webbed cross section in lieu of the solid section shown in the original sketch, in the interest of removing excess material and unnecessary weight from the support.

Another feature of other concepts is making the top a modular component that could be easily changed out depending on the type of support required (single pipe, multiple pipe, strut, etc.).

It will be appreciated that materials and features described with regard to one of the embodiments or concepts described herein may also be utilized with regard to other embodiments of the invention, or concepts involved in the invention.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rooftop pipe support comprising:
a base; and
a top portion having a pipe-receiving recess;
wherein one of the top portion or the base has protrusions that engage protrusion-engaging recesses in the other of the top portion or the base, holding the base and the top portion together;
wherein the top portion may be engaged to the base at multiple different heights above a bottom wall of the base;
wherein the pipe-receiving recess is bounded at a bottom portion of the pipe-receiving recess that is closest to the bottom wall, by a rounded surface of the top portion;
wherein, when the top portion is engaged with the base, a closest distance between the rounded surface and the bottom wall of the base, is between, in a direction parallel to the bottom wall, a pair of other locations on the rounded surface that are at a greater distance than the closest distance from the bottom wall;
wherein at least part of the top portion is received into a vertical channel in the base;
wherein the protrusions include teeth of the at least part of the top portion;
wherein the protrusion-engaging recesses are tooth-receiving recesses on opposing inner surfaces of the channel; and
wherein the teeth are angled downward, toward a bottom wall of the base.

2. The pipe support of claim 1, wherein the base and the top portion are both monolithic continuous pieces of a single material.

3. A rooftop pipe support comprising:
a base; and
a top portion having a pipe-receiving recess;
wherein one of the top portion or the base has protrusions that engage protrusion-engaging recesses in the other of the top portion or the base, holding the base and the top portion together;
wherein the top portion may be engaged to the base at multiple different heights above a bottom wall of the base; and
wherein protrusion-engaging recesses have open ends, and the top portion and the base are engaged by sliding the protrusions into the recesses through the open ends, in a direction substantially parallel to the bottom wall of the base.

4. The pipe support of claim 3, wherein the top portion and the base are both made of an elastomeric or polymeric material.

5. The pipe support of claim 3, wherein the top portion and the base are both made of the same material.

6. The pipe support of claim 3, wherein the top portion and the base are both made of a polymeric material.

7. The pipe support of claim 3, wherein the base has a substantially trapezoidal shape.

8. The pipe support of claim 3, wherein the support is a modular pipe support, with the top portion being one of a set of multiple top portions, each of which is configured to engage the base.

9. The pipe support of claim 3,
wherein the top portion has arms that extend away from a remainder of the top portion in a direction away from the bottom wall of the base; and
wherein the arms define in part the pipe-receiving recess.

10. The pipe support of claim 9, further comprising a collapsible web in the pipe-receiving recess.

11. The pipe support of claim 9, further comprising a clip coupling the arms together.

12. The pipe support of claim 11, wherein the clip engages lips at distal ends of the arms.

13. The pipe support of claim 9, wherein top portion has one or more grooves along a bottom of the rounded surface.

14. The pipe support of claim 3, wherein the top portion includes a collapsible web that changes shape to accommodate different sizes of objects placed in contact with the web.

15. The pipe support of claim 3, wherein the base and the top portion are both monolithic continuous pieces of a single material.

16. The pipe support of claim 3, wherein at least part of the top portion is received into a vertical channel in the base.

17. The pipe support of claim 16,
wherein the protrusions include teeth of the at least part of the top portion;
wherein the protrusion-engaging recesses are tooth-receiving recesses on opposing inner surfaces of the channel.

18. The pipe support of claim 17, wherein the teeth are angled downward, toward a bottom wall of the base.

19. The pipe support of claim 3, wherein the top portion includes a toothed post that is inserted into and engaged with a tooth-lined channel of the base.

* * * * *